(12) United States Patent
Clark

(10) Patent No.: US 9,636,967 B2
(45) Date of Patent: May 2, 2017

(54) REFRIGERATION TRAILER AIR DISTRIBUTION CHUTE

(71) Applicant: Signode Industrial Group LLC, Glenview, IL (US)

(72) Inventor: Toby Wynn Clark, Smiths, AL (US)

(73) Assignee: Signode Industrial Group LLC, Glenview, IL (US)

( * ) Notice: Subject to any disclaimer, the term of this patent is extended or adjusted under 35 U.S.C. 154(b) by 481 days.

(21) Appl. No.: 14/263,452

(22) Filed: Apr. 28, 2014

(65) Prior Publication Data
US 2014/0335775 A1   Nov. 13, 2014

Related U.S. Application Data

(60) Provisional application No. 61/822,718, filed on May 13, 2013.

(51) Int. Cl.
*B60H 1/34* (2006.01)
*B60H 1/00* (2006.01)

(52) U.S. Cl.
CPC ..... *B60H 1/00014* (2013.01); *B60H 1/00564* (2013.01); *B60H 1/3407* (2013.01)

(58) Field of Classification Search
CPC . F24F 13/0218; F25D 23/067; B60H 1/06457
USPC .......... 454/152, 903, 69, 83, 88–92; 92/239, 92/408, 329; 62/239, 408, 329
See application file for complete search history.

(56) References Cited

U.S. PATENT DOCUMENTS

| | | | |
|---|---|---|---|
| 2,677,246 | A | 5/1954 | Wehby |
| 3,412,571 | A | 11/1968 | Bolynn |
| 3,551,008 | A | 12/1970 | Cordell |
| 3,792,595 | A | 2/1974 | Willis |
| 4,050,365 | A | 9/1977 | Freeman |
| 4,887,437 | A | 12/1989 | Fenton et al. |
| D319,420 | S | 8/1991 | Brys |

(Continued)

OTHER PUBLICATIONS

Chutes & Adapters, Brochure, ITW Insulated Products, available at http://www.itwip.com/Portals/1/Documents/ITWCHUTESANDADAPTRS2011.pdf, available prior to May 13, 2013 (2 pages).

(Continued)

*Primary Examiner* — Avinash Savani
*Assistant Examiner* — Vivek Shirsat
(74) *Attorney, Agent, or Firm* — Neal, Gerber & Eisenberg LLP

(57) ABSTRACT

Various embodiments of the present disclosure provide a refrigeration trailer air distribution chute. The chute includes a first air director attachable to a ceiling of a refrigeration trailer spanning a refrigeration unit and a side wall of the trailer, and a second air director attachable to and extending along the ceiling proximate the side wall to the rear of the trailer. The first air director is attachable to the ceiling along two lines of attachment, causing the first air director to have a cross section of a first shape regardless of whether the chute is in an unexpanded or an expanded state. The second air director is attachable to the ceiling along one line of attachment, causing the second air director to have a cross section of a second shape when the chute is in the unexpanded state and a third shape when the chute is in the expanded state.

27 Claims, 13 Drawing Sheets

(56) References Cited

U.S. PATENT DOCUMENTS

| | | |
|---|---|---|
| 5,129,235 A | 7/1992 | Renken et al. |
| 5,291,745 A | 3/1994 | Hanson et al. |
| 5,427,237 A | 6/1995 | Kiefer et al. |
| D367,830 S | 3/1996 | Brys |
| 5,769,704 A | 6/1998 | Henning et al. |
| 5,807,046 A | 9/1998 | Onken |
| 5,947,812 A | 9/1999 | Henning et al. |
| 5,993,310 A | 11/1999 | Onken |
| 6,116,044 A | 9/2000 | Gothier |
| 6,203,419 B1 | 3/2001 | Onken |
| 6,305,128 B1 | 10/2001 | Horner |
| RE37,634 E | 4/2002 | Hickman et al. |
| 6,508,076 B1 | 1/2003 | Gast et al. |
| 6,626,753 B2 | 9/2003 | Onken |
| 6,746,323 B1 | 6/2004 | Digby, Jr. |
| 6,827,534 B2 | 12/2004 | Onken |
| 6,830,065 B2 | 12/2004 | Sinur et al. |
| 6,945,865 B1 | 9/2005 | Turek |
| 7,249,921 B2 | 7/2007 | McMahon et al. |
| 7,351,136 B2 | 4/2008 | Nelson et al. |
| 8,298,056 B2 | 10/2012 | Clark |
| 2005/0215189 A1 | 9/2005 | Nelson |
| 2006/0182577 A1* | 8/2006 | Orlando ............. B60H 1/00014 414/529 |
| 2008/0190129 A1 | 8/2008 | Clark et al. |
| 2009/0320514 A1 | 12/2009 | Clark et al. |
| 2011/0011122 A1 | 1/2011 | Clark |
| 2011/0269390 A1* | 11/2011 | Pinkalla .................. F16L 11/02 454/284 |
| 2013/0220469 A1* | 8/2013 | Fleagle ............... F24F 13/0218 138/107 |

OTHER PUBLICATIONS

Two Finger Chute—Installation Instructions, ITW Insulated Products, available at https://web.archive.org/web/20121229041613/http://www.itwip.com/LinkClick.aspx?fileticket=tEMJquBGaws%3d&tabid=115, printed Jan. 8, 2013 (1 page).

* cited by examiner

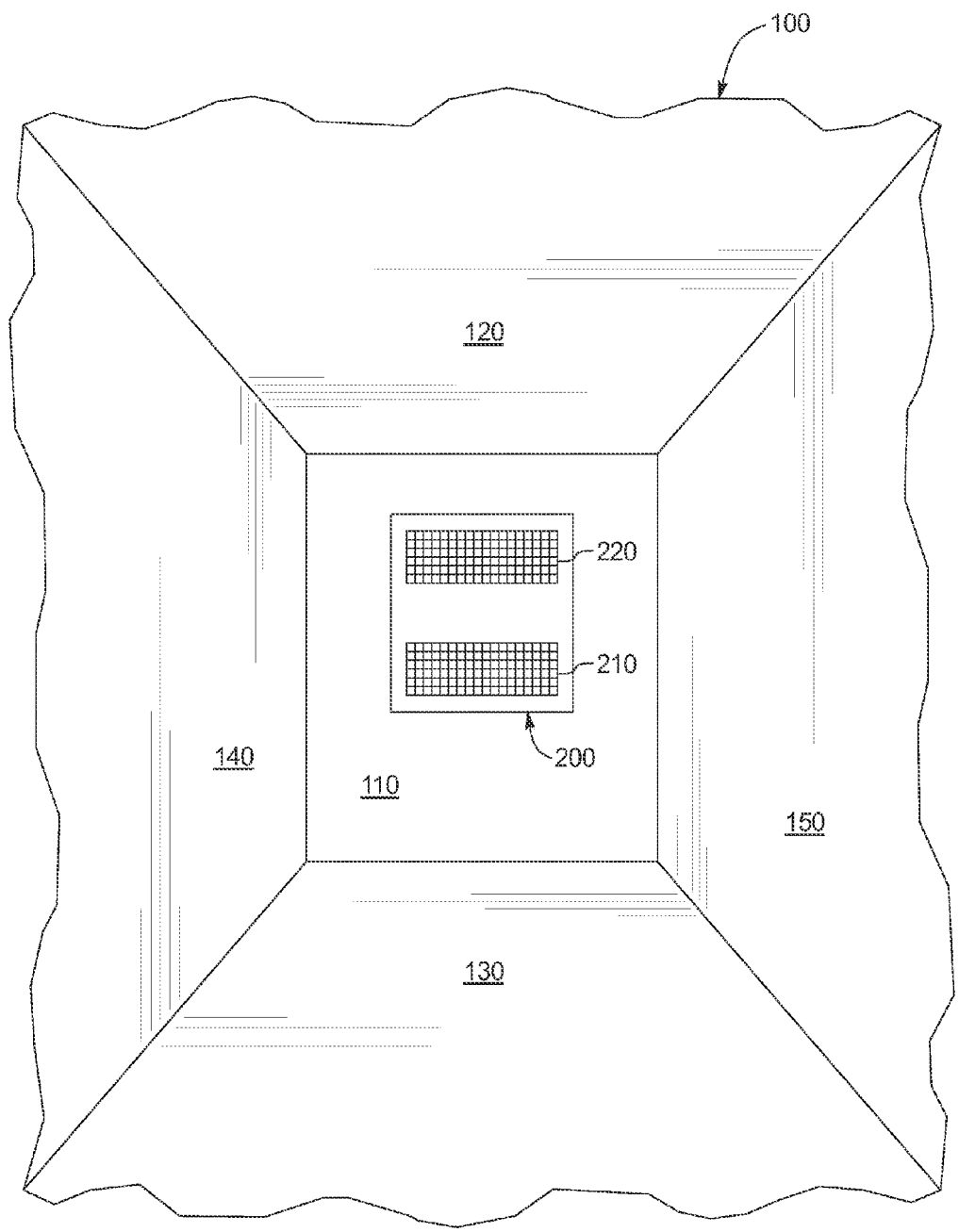

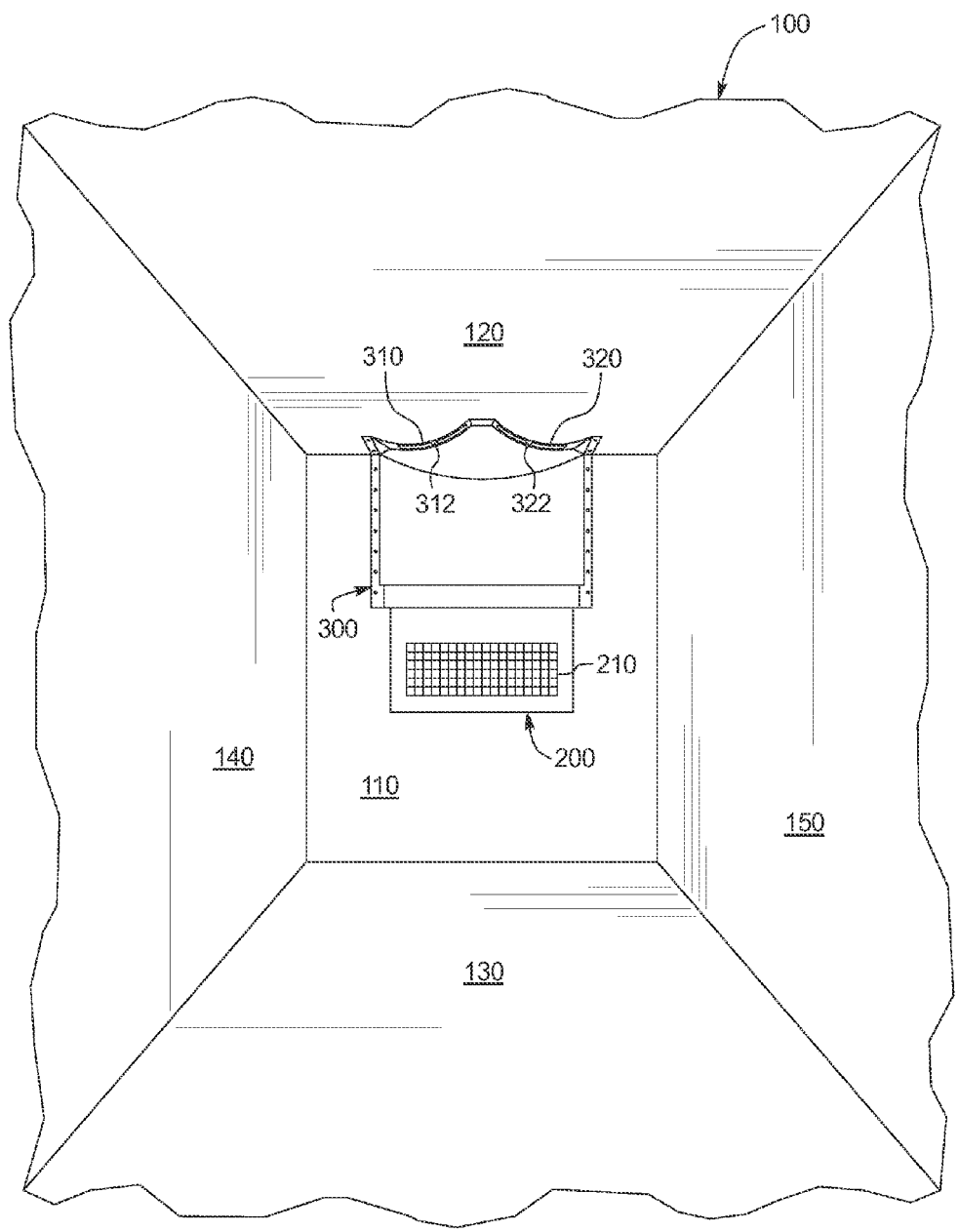

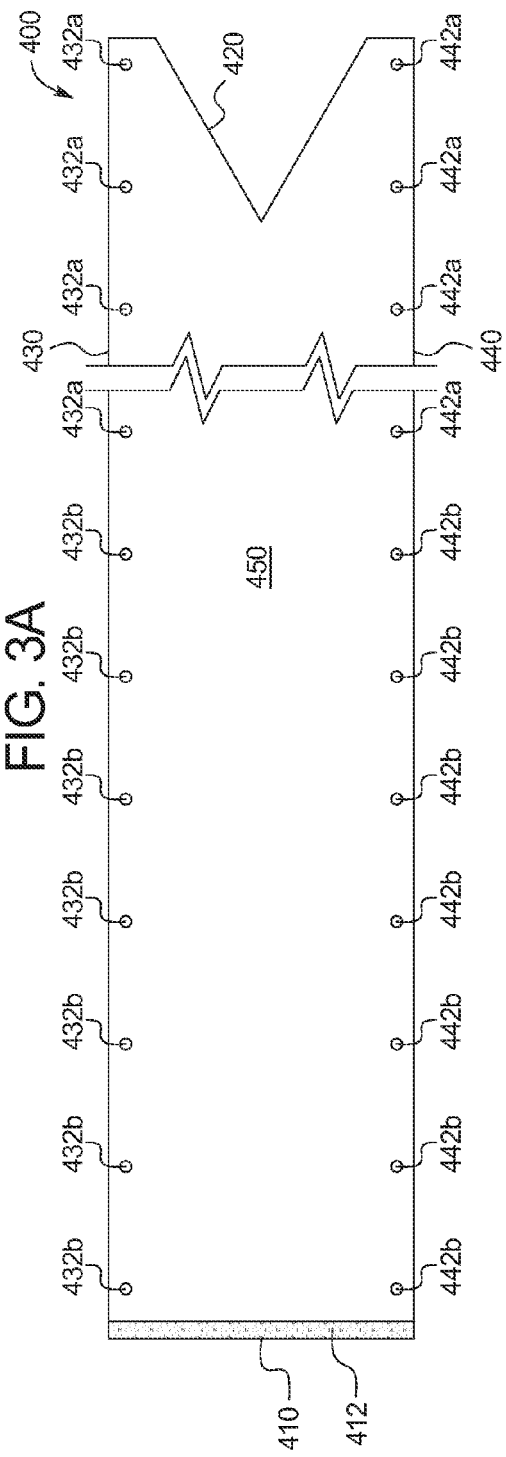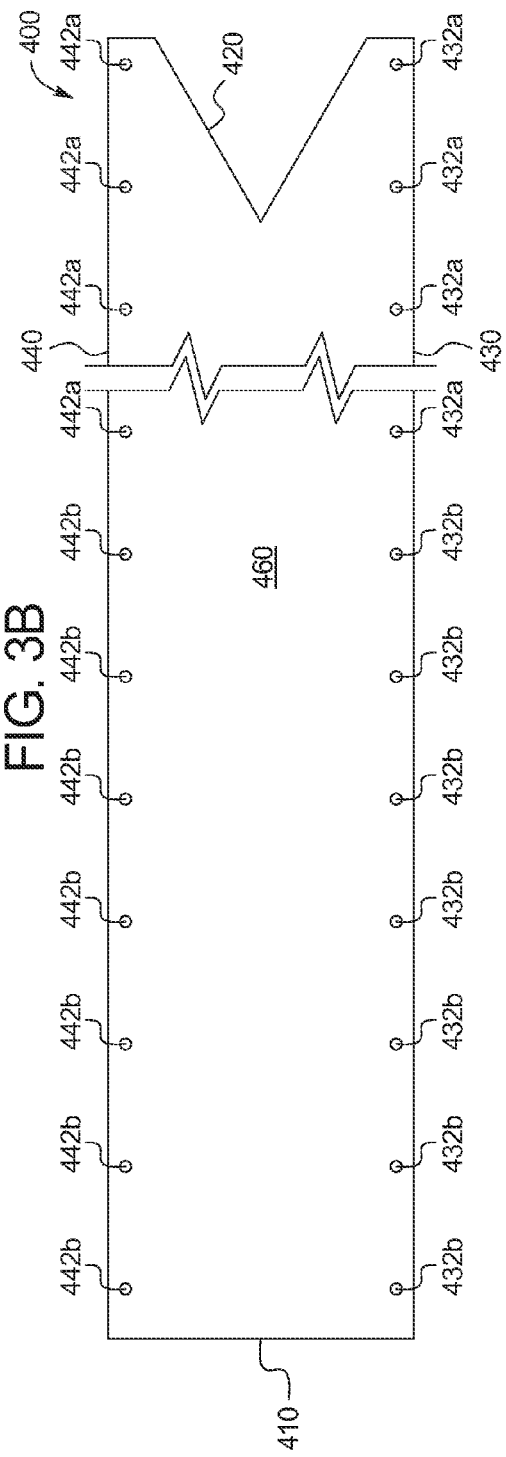

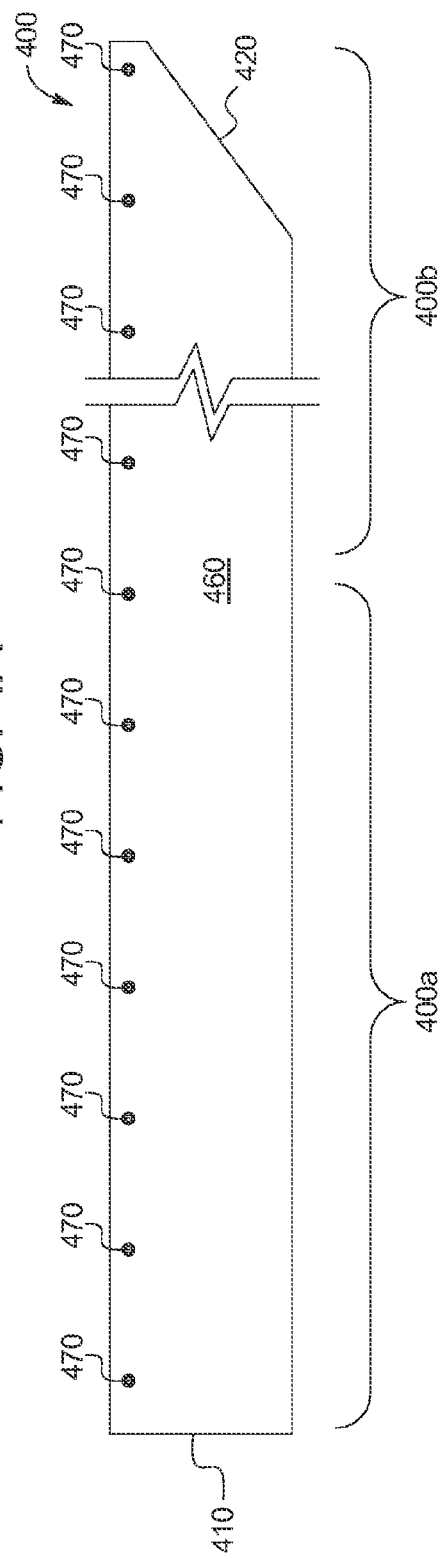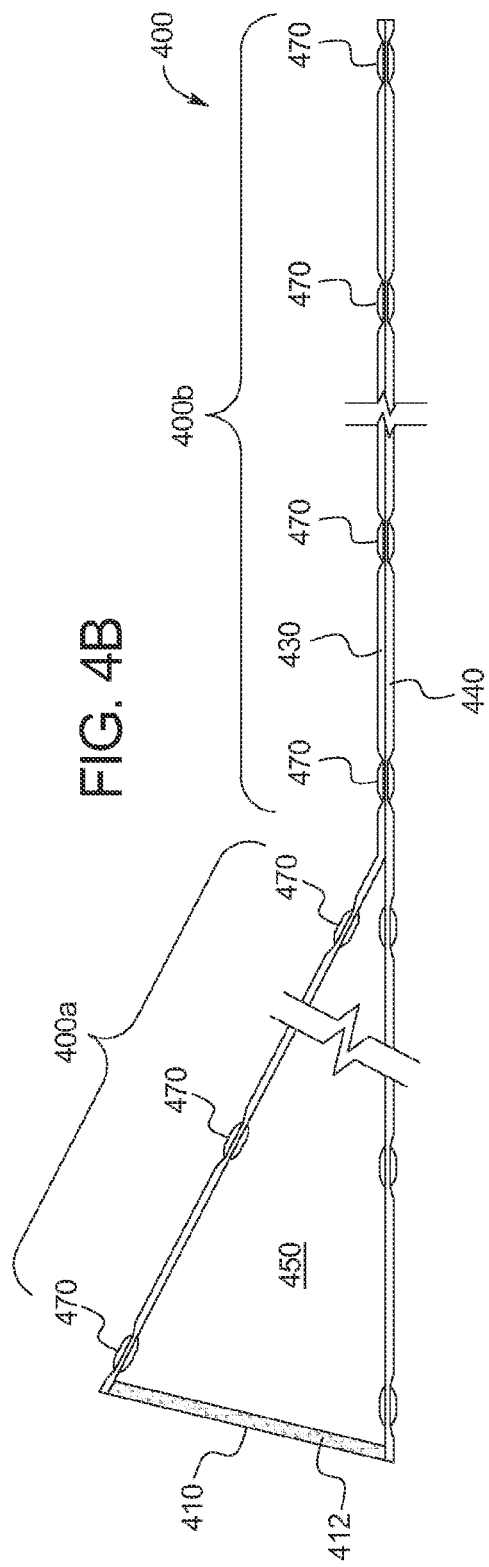

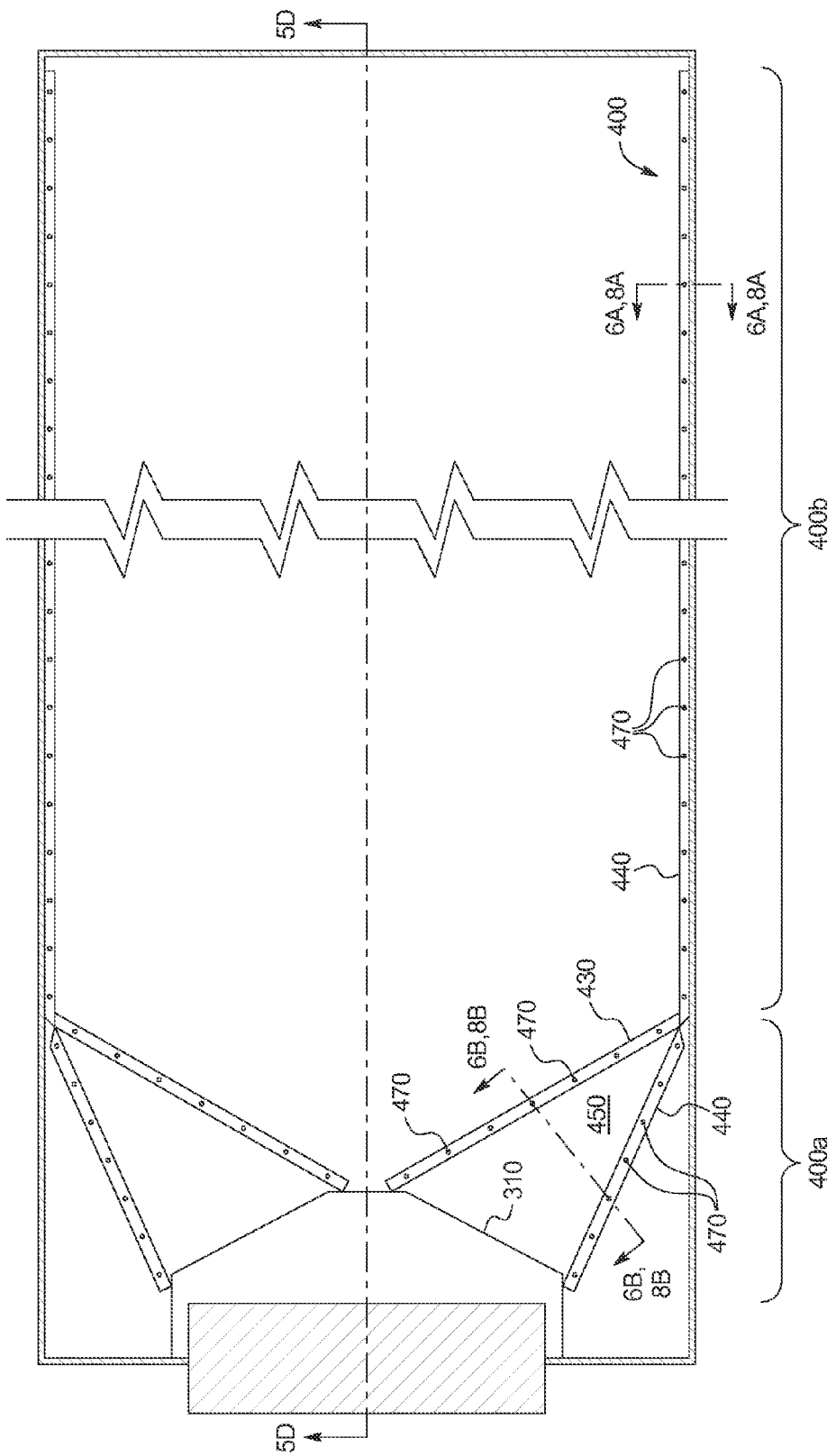

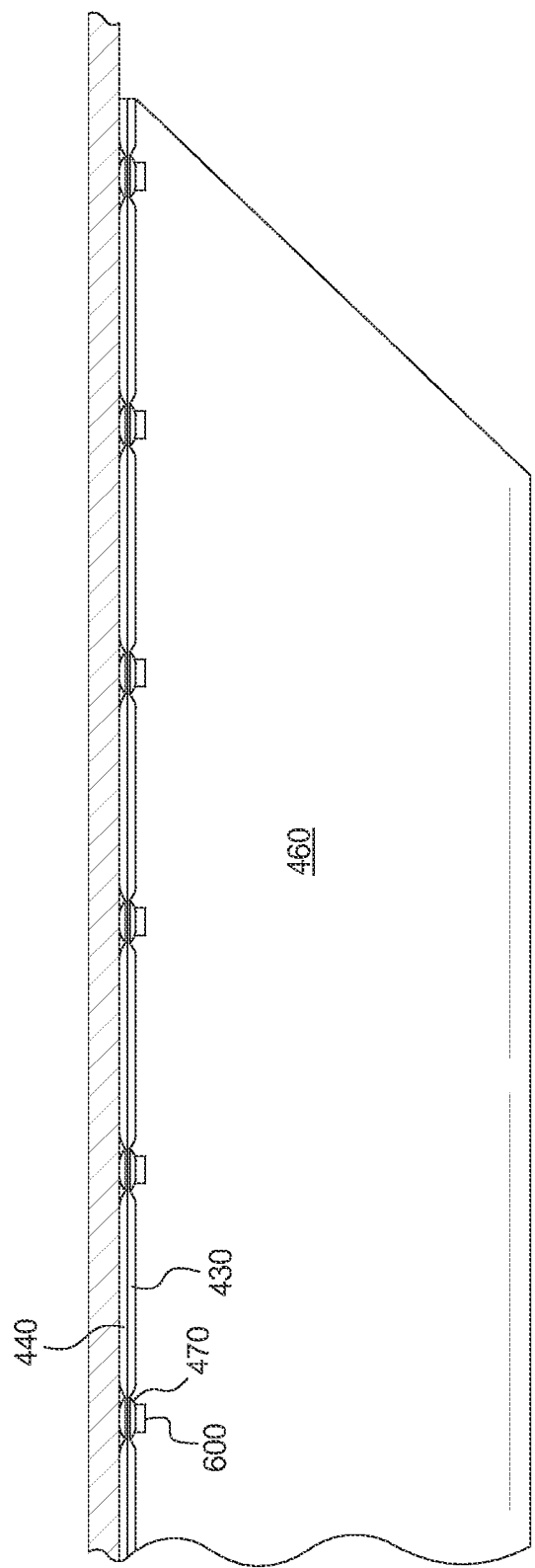

REFRIGERATION TRAILER AIR DISTRIBUTION CHUTE

PRIORITY CLAIM

This application claims priority to and the benefit of U.S. Provisional Patent Application No. 61/822,718, filed on May 13, 2013, the entire contents of which are incorporated herein by reference.

BACKGROUND

Temperature controlled refrigeration trailers or cargo containers are commonly used to transport temperature-sensitive cargo, such as food products, that must be maintained within a specific temperature range. Each such refrigeration trailer employs one of a variety of different types of cooling systems to control the temperature within the refrigeration trailer to ensure that the temperature is maintained within the desired range. Certain known refrigeration trailers employ a refrigeration unit located at the front or nose of the refrigeration trailer to control the temperature within the refrigeration trailer. The refrigeration unit includes an air intake, typically located near the bottom of the refrigeration unit, and an air outlet, typically located near the top of the refrigeration unit. To cool the air within the refrigeration trailer, the refrigeration unit draws air from the bottom of the refrigeration trailer into the refrigeration unit through the air intake, cools the air via one of a variety of different conventional manners, and expels the cooled air into the upper portion of the refrigeration trailer through the air outlet.

One of a variety of known air distribution chutes is typically used to distribute the cooled air expelled from the air outlet of the refrigeration unit down the length of the refrigeration trailer to the rear of the refrigeration trailer (i.e., to the end opposite the refrigeration unit). Generally, such known air distribution chutes are attached to the ceiling of the refrigeration trailer, are fluidically connected to the air outlet of the refrigeration unit, and are configured to guide the cooled air expelled from the air outlet toward the rear of the refrigeration trailer, which reduces or substantially eliminates the likelihood that cooled air expelled from the air outlet will immediately be drawn back into the air intake.

In certain refrigeration trailers, one known air distribution chute extends along the center of the ceiling of the refrigeration trailer from the air outlet of the refrigeration unit to the rear of the refrigeration trailer. This known air distribution chute includes a chute header and a single chute body that, when installed, fluidically connect this known air distribution chute to the air outlet of the refrigeration unit such that the cooled air expelled from the air outlet may travel from the air outlet to the rear of the refrigeration unit through an air passageway formed between this known air distribution chute and the ceiling of the refrigeration trailer. The chute header is attachable to the refrigeration unit (as described below), includes a plurality of grommets around its periphery to facilitate attachment to the front wall and the ceiling of the refrigeration trailer (as described below), and is sewn or otherwise attached to a front end of the chute body.

The chute body (prior to installation) is rectangular and includes opposing front and rear edges, which are about 60 inches (152.4 centimeters) long, and opposing side edges having a length substantially equal to the length of the interior of the refrigeration trailer. The chute body includes two substantially identical sets of grommets spaced along the length of the chute body proximate each side edge to facilitate attachment of each side edge to the ceiling of the refrigeration trailer along two substantially parallel, spaced apart lines of attachment (as described below). Here, for each set of grommets, the grommets of the set are spaced apart along each side edge of the length of the chute body by about 24 inches (60.96 cm).

To install this known air distribution chute, an installer draws guide lines down the center of the ceiling of the refrigeration trailer from the refrigeration unit to the rear of the refrigeration trailer. The installer uses these guide lines to center the chute body of this known air distribution chute on the ceiling of the refrigeration trailer to ensure proper air flow. The guide lines are spaced apart such that after the chute body is installed, gravity causes the center of the chute body to hang down or droop about 6 to 8 inches (15.24 to 20.32 centimeters) below the ceiling of the refrigeration trailer along the entire length of the chute body. This ensures that enough cooled air flows from the air outlet of the refrigeration unit to the rear of the refrigeration trailer, but creates substantial problems, as described below. The installer uses metal adaptors to attach the chute header to the front wall of the refrigeration trailer to cover or span the air outlet of the refrigeration unit. The installer attaches the chute header to the front wall and the ceiling of the refrigeration trailer by inserting fasteners through the grommets around the periphery of the chute header and into the front wall and the ceiling. Using the guide lines for guidance, the installer inserts fasteners through the grommets down the length of the chute body and into the ceiling of the refrigeration trailer to attach the chute body to the ceiling along the two substantially parallel, spaced apart lines of attachment (i.e., a first line of attachment associated with the grommets proximate one of the side edges of the chute body and a second line of attachment associated with the grommets proximate the other side edge of the chute body). As noted above, after installation, the air outlet of the refrigeration unit, the chute header, and the chute body are fluidically connected, and an air passageway is formed between this known air distribution chute and the ceiling of the refrigeration trailer through which the cooled air may travel from the air outlet to the rear of the refrigeration trailer.

There are numerous drawbacks to employing this known air distribution chute including a single chute body extending along the center of the ceiling of the refrigeration trailer. Because the chute body of this known air distribution chute is attached to the ceiling along two substantially parallel lines of attachment, the general shape of the cross section of the chute body is substantially the same (e.g., "U" or "V" shaped) regardless of whether air is flowing through this known air distribution chute. Because the chute body hangs or droops from the ceiling at all times along the entire length of the chute body after installation, the chute body is frequently subject to damage when loading and unloading cargo into and from the refrigeration trailer. For example, when using a forklift to load a pallet of materials into or to unload a pallet of materials from the refrigeration trailer, the forklift mask and/or the materials on the pallet may contact the drooping chute body, causing it to tear or ripping it off of the ceiling. This could cause this known air distribution chute to require replacement, repairs, or re-installation, which are time consuming and expensive.

Additionally, the installation process for this known air distribution chute, described above, is laborious and time consuming. For instance, in one example in which the refrigeration trailer is a 40 foot refrigeration trailer, in addition to drawing guide lines and attaching the chute header to the refrigeration unit and the front wall and the ceiling of the refrigeration trailer, the installer has to attach the chute body of this known air distribution chute to the ceiling at about forty different points of attachment (i.e., about every 24 inches down the length of each side edge of the chute body).

Further, this known air distribution chute covers about two-thirds of the ceiling, and often covers or substantially covers some or all of any lights mounted on the ceiling. This makes it difficult for a worker, such as forklift driver, to see when loading and unloading cargo into and from the refrigeration trailer. The bad lighting conditions could cause the forklift driver to damage the cargo (e.g., run into the cargo with the forklift or place the cargo in an undesired or unstable area) or to work more slowly, which wastes time and money. Additionally, the proximity of the chute body to the ceiling causes heat to be transferred to the cooled air (such as from the lights), which warms the air and reduces the effectiveness of this known air distribution chute.

To alleviate certain of these drawbacks, other refrigeration trailers employ an air distribution chute including two chute bodies extending along the lengths of opposing sides of the ceiling of the refrigeration trailer proximate the opposing side walls of the refrigeration trailer from the air outlet of the refrigeration unit to the rear of the refrigeration trailer. This known air distribution chute includes a chute header and two chute bodies that, when installed, fluidically connect this known air distribution chute to the air outlet of the refrigeration unit such that the cooled air expelled from the air outlet may travel from the air outlet to the rear of the refrigeration unit through air passageways formed between this known air distribution chute and the ceiling of the refrigeration trailer. The chute header is attachable to the refrigeration unit (as described below), includes a plurality of grommets around its periphery to facilitate attachment to the front wall and the ceiling of the refrigeration trailer (as described below), and is sewn or otherwise attached to a front end of each chute body. The chute bodies are substantially identical to those described above, but each have front and rear edges that are either 20 inches (50.8 centimeters) long or 30 inches (76.2 centimeters) long.

To install this known air distribution chute, for each side of the ceiling of the refrigeration trailer, an installer draws guide lines on the ceiling from the refrigeration unit toward that side of the ceiling and then to the rear of the refrigeration trailer. The guide lines of each set are spaced apart such that after the chute body is installed using those guide lines, gravity causes the center of the chute body to hang down or droop about 6 to 8 inches (15.24 to 20.32 centimeters) below the ceiling of the refrigeration trailer along the entire length of the chute body. This ensures that enough cooled air flows from the air outlet of the refrigeration unit to the rear of the refrigeration trailer, but creates substantial problems, as described below. The installer uses metal adaptors to attach the chute header to the front wall of the refrigeration trailer to cover or span the air outlet of the refrigeration unit. The installer attaches the chute header to the front wall and the ceiling of the refrigeration trailer by inserting fasteners through the grommets around the periphery of the chute header and into the front wall and the ceiling.

For a first one of the sets of guide lines, using those guide lines for guidance, the installer inserts fasteners through the grommets down the length of a first one of the chute bodies and into the ceiling of the refrigeration trailer to attach the first chute body to the ceiling along the two substantially parallel, spaced apart lines of attachment (i.e., a first line of attachment associated with the grommets proximate one of the side edges of the first chute body and a second line of attachment associated with the grommets proximate the other side edge of the first chute body). The installer repeats this process for the second set of guide lines to attach the second chute body to the ceiling proximate the opposite side of the ceiling. As noted above, after installation, the air outlet of the refrigeration unit, the chute header, and the chute bodies are fluidically connected, and air passageways are formed between this known air distribution chute and the ceiling of the refrigeration trailer through which the cooled air may travel from the air outlet to the rear of the refrigeration trailer.

While the use of this known air distribution chute having two chute bodies extending along opposing sides of the ceiling of the refrigeration trailer provides relatively better air flow than the known air distribution chute having a single chute body extending along the center of the ceiling of the refrigeration trailer, it fails to solve certain of the above-described problems and creates additional problems.

The use of two chute bodies doubles the chance (relative to the use of a single chute body) that one of the chute bodies will be damaged during loading and unloading of cargo into and from the refrigeration trailer. More specifically, because each chute body is attached to the ceiling along two substantially parallel, spaced apart lines of attachment, the general shape of the cross section of each chute body is substantially the same (e.g., "U" or "V" shaped) regardless of whether air is flowing through this known air distribution chute. Because each chute body hangs or droops from the ceiling at all times along the entire length of the chute body after installation, each chute body is frequently subject to damage when loading and unloading cargo into and from the refrigeration trailer. For example, when using a forklift to load a pallet of materials into or to unload a pallet of materials from the refrigeration trailer, the forklift mask and/or the materials on the pallet may contact one or more of the drooping chute bodies, causing one or more of the chute bodies to tear or ripping one or more of the chute bodies off of the ceiling. This could cause this known air distribution chute to require replacement, repairs, or re-installation, which is time consuming and expensive.

Further, this known air distribution chute employing two chute bodies also covers about two-thirds of the ceiling, and often covers or substantially covers some or all of any lights mounted on the ceiling. This makes it difficult for a worker, such as forklift driver, to see when loading and unloading cargo into and from the refrigeration trailer. The bad lighting conditions could cause the forklift driver to damage the cargo (e.g., run into the cargo with the forklift or place the cargo in an undesired or unstable area) or to work more slowly, which wastes time and money. Additionally, the proximity of the chute body to the ceiling causes heat to be transferred to the cooled air (such as from the lights), which warms the air and reduces the effectiveness of this known air distribution chute.

The use of two chute bodies rather than a single chute body doubles the material cost, doubles the hardware cost, doubles the installation time, and doubles the labor cost when compared to the single air distribution chute down the center of the ceiling. For instance, in the above-described example in which the refrigeration trailer is a 40 foot refrigeration trailer, in addition to drawing guide lines and attaching the chute header to the refrigeration unit and the front wall and the ceiling of the refrigeration trailer, the installer has to attach each chute body of this known air distribution chute to the ceiling at about forty different points of attachment (i.e., about every 24 inches down the length of each side edge of the chute body), resulting in eighty points of attachment for both chute bodies combined.

Accordingly, there is a need for new and improved refrigeration trailer air distribution chutes that solve these problems.

SUMMARY

Various embodiments of the present disclosure provide a refrigeration trailer air distribution chute. The refrigeration trailer air distribution chute of the present disclosure is configured to be installed in a refrigeration trailer and to receive cooled air expelled from a refrigeration unit mounted to a front wall of the refrigeration trailer through a chute inlet and direct the received cooled air along the ceiling of the refrigeration trailer toward the side wall of the refrigeration trailer and along the side wall to a chute outlet located near the rear of the refrigeration trailer such that the cooled air is expelled from the air distribution chute through the chute outlet.

One embodiment of the refrigeration trailer air distribution chute of the present disclosure includes a first air director that defines the chute inlet and is attachable to the ceiling of the refrigeration trailer spanning the refrigeration unit and the side wall of the refrigeration trailer, and a second air director that defines the chute outlet and is attachable to the ceiling of the refrigeration trailer proximate the side wall of the refrigeration trailer spanning the length of the side wall to the rear of the refrigeration trailer. In this embodiment, the first air director is attachable to the ceiling along two lines of attachment, and the second air director is attachable to the ceiling along a single line of attachment. The first air director is configured to direct cooled air expelled from the refrigeration unit and received through the chute inlet toward the side wall of the refrigeration trailer, and the second air director is then configured to direct that cooled air along the side wall to the rear of the refrigeration trailer such that the cooled air is expelled near the rear of the refrigeration trailer through the chute outlet.

The refrigeration trailer air distribution chute (and, more specifically, the first and second air directors) has an unexpanded state when air is not flowing through the refrigeration trailer air distribution chute and an expanded state when air is flowing through the refrigeration trailer air distribution chute. Because the first air director of the refrigeration trailer air distribution chute, when installed, is attached to the ceiling of the refrigeration trailer along two lines of attachment, the first air director has a cross section of a first shape (such as a "U" or "V" shape) regardless of whether the refrigeration trailer air distribution chute is the unexpanded state or the expanded state. Since the second air director of the refrigeration trailer air distribution chute, when installed, is attached to the ceiling along a single line of attachment, the second air director has a cross section of a second shape (such as a substantially elliptical shape) when the refrigeration trailer air distribution chute is in the unexpanded state and a third different shape (such as a substantially circular shape) when the refrigeration trailer air distribution chute is in the expanded state.

The variable shape of the cross section of the second air director of the refrigeration trailer air distribution chute caused by the attachment to the ceiling of the refrigeration trailer along a single line of attachment enables the second air director to be attached to the ceiling close to the corner where the ceiling and the side wall meet. Thus, when the refrigeration trailer air distribution chute is in the unexpanded state, the second air director hangs substantially parallel to and along the side wall.

In this embodiment, the refrigeration trailer air distribution chute does not include an integrated chute header configured to funnel the cooled air expelled from the refrigeration unit to the chute inlet defined by the first air director. Rather, in this embodiment, the first air director is attachable proximate a front edge of the first air director, which in part defines the chute inlet, to an air flow adapter mounted to the refrigeration unit and the front wall and ceiling of the refrigeration trailer. In this embodiment, the air flow adapter is configured to funnel the cooled air expelled from the refrigeration unit to the chute inlet defined by the first air director. In other embodiments, however, the refrigeration trailer air distribution chute includes an integrated chute header attached to the first air director that is configured to funnel the cooled air expelled from the refrigeration unit to the chute inlet defined by the first air director.

The refrigeration trailer air distribution chute of the present disclosure solves the above-described problems. As noted above, because the second air director of the refrigeration trailer air distribution chute is attached to the ceiling along a single line of attachment, in the unexpanded state, the second air director of the refrigeration trailer air distribution chute hangs substantially parallel to and along the side wall of the refrigeration trailer. Since the second air director of the refrigeration trailer air distribution chute in the unexpanded state hangs substantially parallel to and along the side wall of the refrigeration trailer, the potential for damage to the refrigeration trailer air distribution chute when loading and unloading cargo into and from the refrigeration trailer, such as tearing the refrigeration trailer air distribution chute or ripping the refrigeration trailer air distribution chute from the ceiling, is minimized. This greatly reduces the need for replacement of, repairs to, or re-installation of the refrigeration trailer air distribution chute.

Additionally, the installation process for the refrigeration trailer air distribution chute of the present disclosure is simple and quick—it does not require any guide lines to be measured or drawn and enables the installer to use the corner where the ceiling of the refrigeration trailer meets the side wall of the refrigeration trailer to properly align the refrigeration trailer air distribution chute. Also, since the second air director of the refrigeration trailer air distribution chute is attached to the ceiling along a single line of attachment, the refrigeration trailer air distribution chute of the present disclosure is attached to the ceiling at about half of the quantity of attachment points as traditional known air distribution chutes.

Further, since the second air director of the refrigeration trailer air distribution chute is attached to the ceiling along a single line of attachment and hangs substantially parallel to and along the side wall of the refrigeration trailer in the unexpanded state, the refrigeration trailer air distribution chute covers a minimal amount of the ceiling and a minimal amount (if any) of any lights on the ceiling. This also substantially reduces heat transfer from the ceiling of the refrigeration trailer to the cooled air.

Additional features and advantages of the present disclosure are described in, and will be apparent from, the following Detailed Description and the Figures.

BRIEF DESCRIPTION OF THE DRAWINGS

FIG. 1 is a front elevational view into an interior of an example refrigeration trailer in which the air distribution chute of the present disclosure may be employed.

FIG. 2 is a front elevational view into the interior of the refrigeration trailer of FIG. 1 in which an air flow adapter is mounted to a front wall of the refrigeration trailer.

FIG. 3A is a top plan view of an example of an unassembled and uninstalled refrigeration trailer air distribution chute of one embodiment the present disclosure.

FIG. 3B is a bottom plan view of the refrigeration trailer air distribution chute of FIG. 3A.

FIG. 4A is a side elevational view of an example of an assembled and uninstalled refrigeration trailer air distribution chute of one embodiment of the present disclosure.

FIG. 4B is a top plan view of the refrigeration trailer air distribution chute of FIG. 4A.

FIG. 5C is a top plan view of the refrigeration trailer of FIG. 1 in which the plurality of refrigeration trailer air distribution chutes of FIGS. 5A and 5B are installed, wherein the refrigeration trailer air distribution chutes are in the unexpanded state.

FIG. 5D is a cross-sectional view of the refrigeration trailer showing a rear end of one of the installed refrigeration trailer air distribution chutes of FIGS. 5A, 5B, and 5C taken substantially along line 5D-5D of FIG. 5C, wherein the refrigeration trailer air distribution chute is in the unexpanded state.

DETAILED DESCRIPTION

Figure 5A:
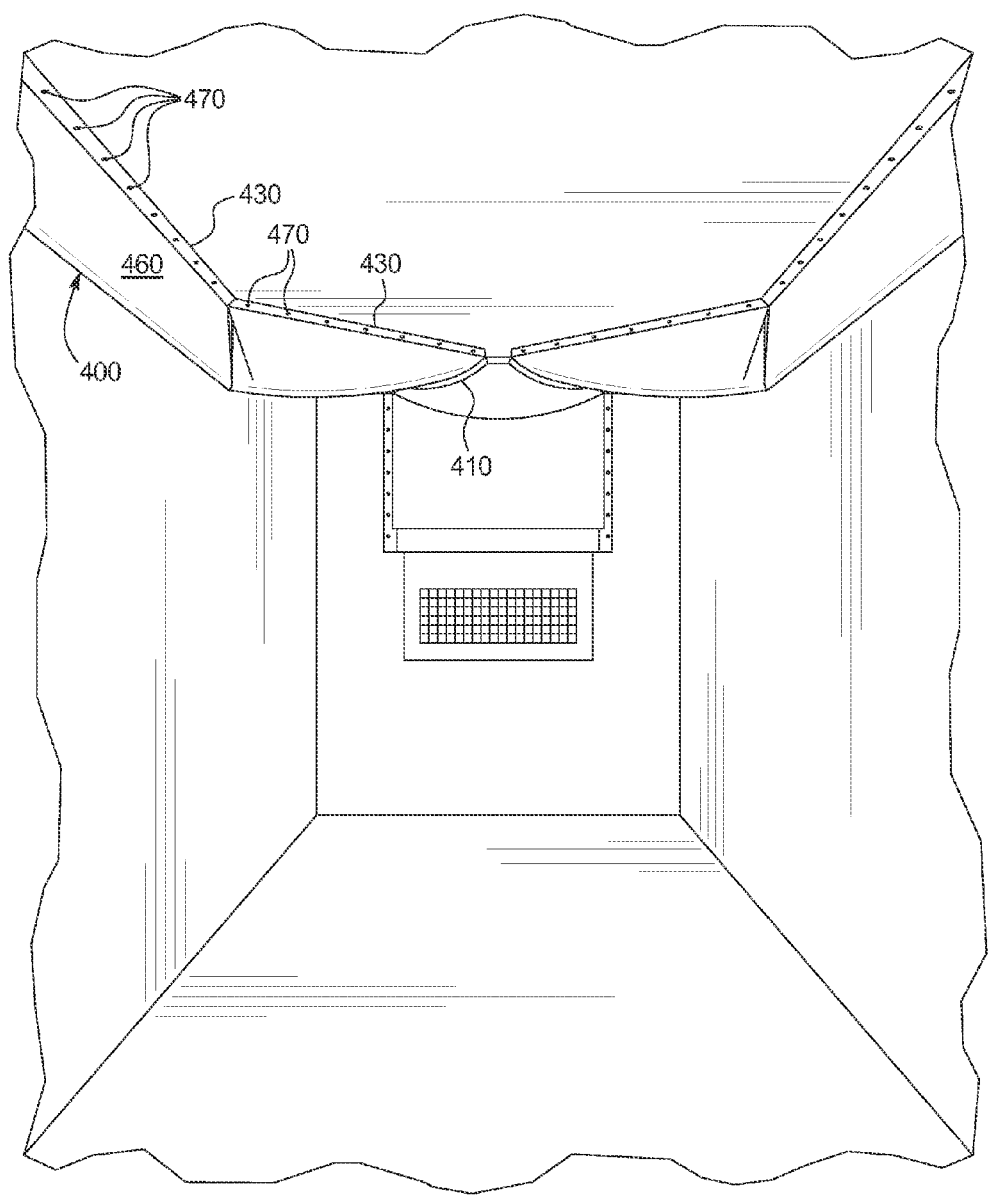
FIG. 5A is a front elevational view into the interior of the refrigeration trailer of FIG. 1 in which a plurality of example refrigeration trailer air distribution chutes of the present disclosure are installed, wherein the refrigeration trailer air distribution chutes are in an unexpanded state.
Figure 5B:
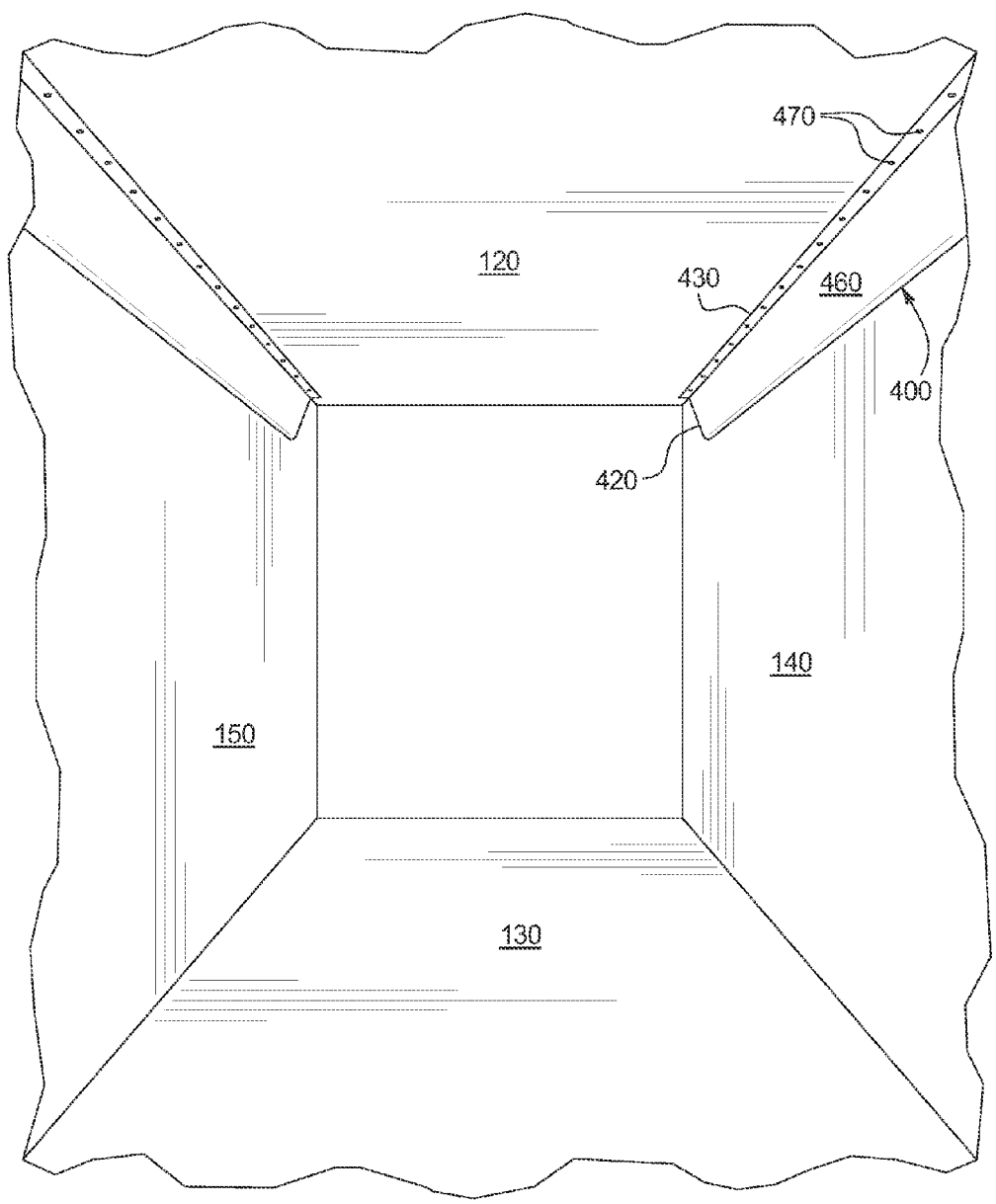
FIG. 5B is a front elevational view out of the interior of the refrigeration trailer of FIG. 1 in which the plurality of refrigeration trailer air distribution chutes of FIG. 5A are installed, wherein the refrigeration trailer air distribution chutes are in the unexpanded state.

Various embodiments of the present disclosure provide a refrigeration trailer air distribution chute. The refrigeration trailer air distribution chute of the present disclosure is configured to be installed in a refrigeration trailer and to receive cooled air expelled from a refrigeration unit mounted to a front wall of the refrigeration trailer through a chute inlet and direct the received cooled air along the ceiling of the refrigeration trailer toward the side wall of the refrigeration trailer and along the side wall to a chute outlet located near the rear of the refrigeration trailer such that the cooled air is expelled from the air distribution chute through the chute outlet.

One embodiment of the refrigeration trailer air distribution chute of the present disclosure includes a first air director that defines the chute inlet and is attachable to the ceiling of the refrigeration trailer spanning the refrigeration unit and the side wall of the refrigeration trailer, and a second air director that defines the chute outlet and is attachable to the ceiling of the refrigeration trailer proximate the side wall of the refrigeration trailer spanning the length of the side wall to the rear of the refrigeration trailer. In this embodiment, the first air director is attachable to the ceiling along two lines of attachment, and the second air director is attachable to the ceiling along a single line of attachment. The first air director is configured to direct cooled air expelled from the refrigeration unit and received through the chute inlet toward the side wall of the refrigeration trailer, and the second air director is then configured to direct that cooled air along the side wall to the rear of the refrigeration trailer such that the cooled air is expelled near the rear of the refrigeration trailer through the chute outlet.

The refrigeration trailer air distribution chute (and, more specifically, the first and second air directors) has an unexpanded state when air is not flowing through the refrigeration trailer air distribution chute and an expanded state when air is flowing through the refrigeration trailer air distribution chute. Because the first air director of the refrigeration trailer air distribution chute, when installed, is attached to the ceiling of the refrigeration trailer along two lines of attachment, the first air director has a cross section of a first shape (such as a "U" or "V" shape) regardless of whether the refrigeration trailer air distribution chute is the unexpanded state or the expanded state. Since the second air director of the refrigeration trailer air distribution chute, when installed, is attached to the ceiling along a single line of attachment, the second air director has a cross section of a second shape (such as a substantially elliptical shape) when the refrigeration trailer air distribution chute is in the unexpanded state and a third different shape (such as a substantially circular shape) when the refrigeration trailer air distribution chute is in the expanded state.

The variable shape of the cross section of the second air director of the refrigeration trailer air distribution chute caused by the attachment to the ceiling of the refrigeration trailer along a single line of attachment enables the second air director to be attached to the ceiling close to the corner where the ceiling and the side wall meet. Thus, when the refrigeration trailer air distribution chute is in the unexpanded state, the second air director hangs substantially parallel to and along the side wall.

Referring now to the drawings, FIG. 1 generally illustrates the interior of a refrigeration trailer 100 in which the refrigeration trailer air distribution chute of the present disclosure, which is sometimes referred to herein as the air distribution chute for brevity, may be installed. The refrigeration trailer 100 includes a front wall 110, a ceiling 120, a floor 130 opposite the ceiling 120, a first side wall 140, and a second side wall 150 opposite the first side wall 140. A refrigeration unit 200 is mounted to the front wall 110 of the refrigeration trailer 100, and includes an air intake 210 and an air outlet 220. In operation, the refrigeration unit 200 draws air from the refrigeration trailer 100 into the refrigeration unit 200 through the air intake 210, cools the air, and expels the cooled air back into the refrigeration trailer 100 through the air outlet 220. It should be appreciated that any suitable refrigeration unit may be employed.

FIG. 2 illustrates an example air flow adapter 300 mounted to the front wall 110 and the ceiling 120 of the refrigeration trailer 100. The air flow adapter is configured to redirect the flow of air expelled from the air flow outlet 220 of the refrigeration unit 200. More specifically, the air flow adapter 300 is attached to the front wall 110 and the ceiling 120 such that the air flow adapter 300 is fluidically connected to and covers or spans the air outlet 220 of the refrigeration unit 200. The air flow adapter 300 is configured to funnel the cooled air expelled by the refrigeration unit 200 through the air outlet 220 to: (a) a first air flow adapter outlet defined by a first air flow adapter outlet defining edge 310 and the ceiling 120 of the refrigeration trailer 100, and (b) a second air flow adapter outlet defined by a second air flow adapter outlet defining edge 320 and the ceiling 120 of the refrigeration trailer 100.

Additionally, in this example, a hook portion 312 of a first hook and loop fastener is disposed on an exterior surface of the air flow adapter 300 proximate the first air flow adapter outlet defining edge 310, and a hook portion 322 of a second hook and loop fastener is disposed on the exterior surface of the air flow adapter 300 proximate the second air flow adapter outlet defining edge 320. As described below, the air distribution chutes of the present disclosure include the corresponding loop portions of the first and second hook and loop fasteners, which enables the air distribution chutes to be removably attached to the air flow adapter 300 such that the air distribution chutes are fluidically connected to the air flow adapter 300. In other embodiments, the air distribution chutes include the hook portions and the air flow adapter includes the corresponding loop portions. It should be appreciated that any suitable fasteners may be used to removably attach the air distribution chute to the air flow adapter.

It should be appreciated that because the air flow adapter 300 is employed in this embodiment, the refrigeration trailer air distribution chute 400 does not include an integrated chute header configured to funnel the cooled air expelled from the refrigeration unit to the chute inlet defined by the first air director. In other embodiments, however, the refrigeration trailer air distribution chute includes an integrated chute header that is configured to funnel the cooled air expelled from the refrigeration unit to the chute inlet defined by the first air director.

FIGS. 3A and 3B are top and bottom plan views, respectively, of an example of a refrigeration trailer air distribution chute 400 of one embodiment of the present disclosure in an unassembled and uninstalled state. In this example, the air distribution chute 400 includes a front edge 410, an opposing rear edge 420, a first side edge 430, an opposing second side edge 440, a top surface 450, and a bottom surface 460. In this example, a loop portion 412 of the first hook and loop fastener is disposed on the top surface 450 of the air distribution chute 400 proximate the front edge 410. The loop portion 412 of the first hook and loop fastener is configured to removably attach to the hook portion 312 of the first hook and loop fastener disposed on the air flow adapter 300 proximate the first air flow adapter outlet defining edge 310. The air distribution chute 400 defines a first set of a plurality of aligned holes 432a and 432b therethrough proximate the first edge 430 and a second set of a plurality of aligned holes 442a and 442b therethrough proximate the second edge 440. In this example, the rear edge 420 has a "V" shape, which causes the assembled air distribution chute 400 to have a tapered rear profile (as best shown in FIG. 5D).

FIGS. 4A and 4B are side elevational and top plan views, respectively, of the example air distribution chute 400 in an assembled but uninstalled state (i.e., prior to attachment to the ceiling 120 of the refrigeration trailer 100 and to the air flow adapter 300). To assemble the air distribution chute 400, a portion of the air distribution chute 400 is folded in half lengthwise such that the holes 432a align with the holes 442a. A grommet 470 is inserted into each set of aligned holes 432a and 442a to hold the material surrounding the holes 432a and 442a together to ensure the holes remain aligned. A grommet 470 is also inserted into each separate hole 432b and 442b.

After assembly, the air distribution chute 400 includes a first air distributor 400a and a second air distributor 400b. As explained below, the first air distributor 400a is configured to be attached to the ceiling 120 of the refrigeration trailer 100 spanning the refrigeration unit 200 and the first side wall 140 of the refrigeration trailer 100, and the second air distributor 400b is configured to be attached to and extend along the ceiling 120 of the refrigeration trailer 100 proximate the first side wall 140 of the refrigeration trailer 100 to the rear of the refrigeration trailer 100. The first air distributor 400a of the air distribution chute 400 is configured to be attached to the ceiling 120 along two lines of attachment, while the second air distributor 400b of the air distribution chute 400 is configured to be attached to the ceiling 120 along a single line of attachment.

In this example, the front edge 410 of the air distribution chute 400 at least partially defines a chute inlet of the air distribution chute 400 into which the cooled air expelled by the refrigeration unit 200 through the air outlet 220 is funneled by the air flow adapter 300. Additionally, the rear edge 420 of the air distribution chute 400 at least partially defines a chute outlet of the air distribution chute 400 from which the cooled air received through the chute inlet is expelled into the rear of the refrigeration trainer 100.

FIGS. 5A, 5B, 5C, 5D, 6A, and 6B are various views of the air distribution chute 400 after installation and in the unexpanded state, such as when the refrigeration unit 200 is not expelling air through the air outlet 220. That is, FIGS. 5A, 5B, 5C, 5D, 6A, and 6B illustrate the air distribution chute 400 after attachment to the air flow adapter 300 and the ceiling 120 of the refrigeration trailer 100 such that the air outlet 220 of the refrigeration unit 200, the first air flow adapter outlet of the air flow adapter 300, and the air distribution chute 400 are fluidically connected. While two air distribution chutes 400 are attached to opposite sides of the ceiling 120 of the refrigeration trailer 100 are shown, for brevity, one is described below.

To install the air distribution chute 400, an installer attaches the loop portion 412 of the first hook and loop fastener disposed on the top surface 450 of the air distribution chute 400 to the corresponding hook portion 312 of the first hook and loop fastener disposed on the adapter 300 proximate the first air flow adapter outlet defining edge 310. As noted above, the chute inlet into which the cooled air expelled by the refrigeration unit 200 through the air outlet 220 is funneled by the air flow adapter 300 is defined by the front edge 410 of the air distribution chute 400 and the ceiling 120. Working from the adapter 300 toward the first side wall 140, for each hole 432b and each hole 442b of the first air distributor 400a of the air distribution chute 400, the installer inserts a fastener 600 (such as a rivet, though any suitable fasteners may be employed) through the grommet 470 inserted into that hole and into the ceiling 120 of the refrigeration trailer 100 to attach the first air distributor 400a of the air distribution chute 400 spanning the adapter 300 and the first side wall 140 to the ceiling 120 such that the top surface 450 of the first air distributor 400a of the air distribution chute 400 faces the ceiling 120 and the bottom surface 460 of the air distribution chute 400 faces the floor 130. Thus, as best shown in FIG. 5C, the first air distributor 400a of the air distribution chute 400 is attached to the ceiling 120 along two separate lines of attachment: a first line of attachment associated with the grommets 470 inserted into holes 432b and a second line of attachment associated with the grommets 470 inserted into holes 442b.

Figure 6A:
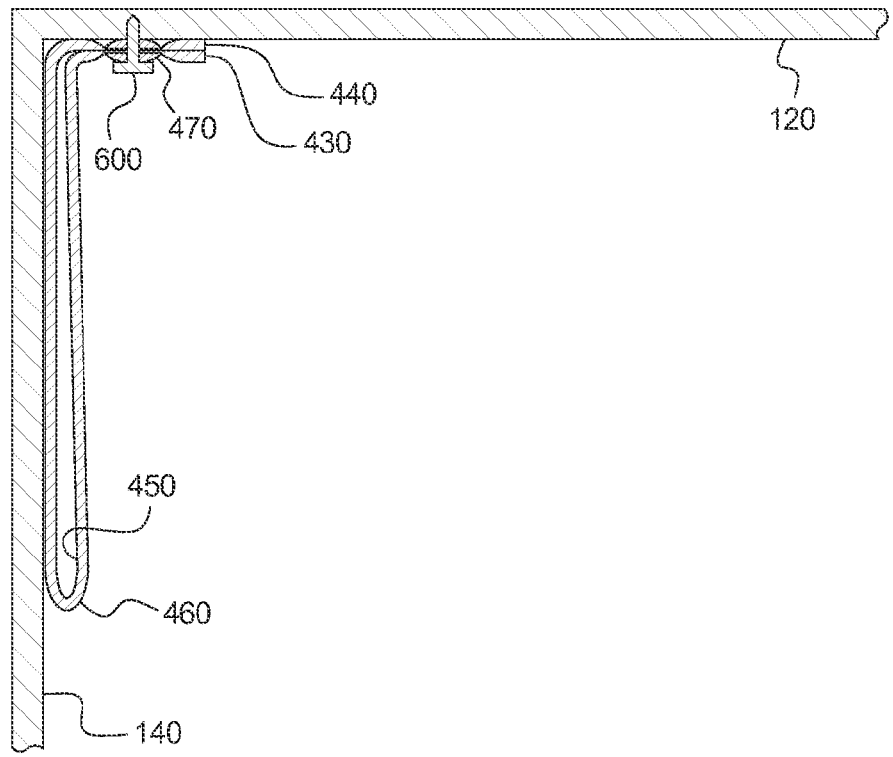
FIG. 6A is a cross-sectional view of a first air director of one of the installed refrigeration trailer air distribution chutes of FIGS. 5A, 5B, and 5C taken substantially along line 6A-6A of FIG. 5C, wherein the refrigeration trailer air distribution chute is in the unexpanded state.
Figure 6B:
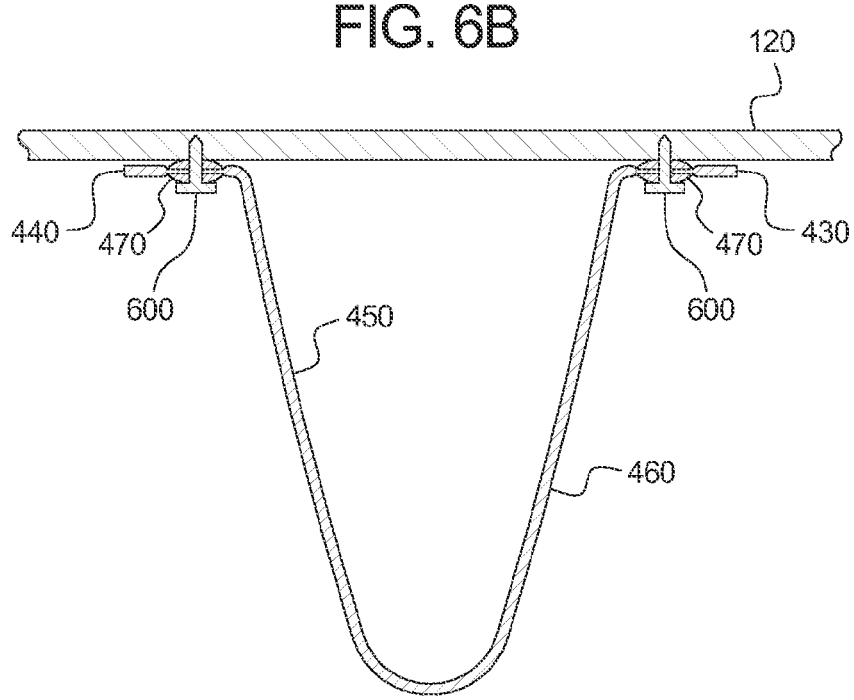
FIG. 6B is a cross-sectional view of a second air director of one of the installed refrigeration trailer air distribution chutes of FIGS. 5A, 5B, and 5C taken substantially along line 6B-6B of FIG. 5C, wherein the refrigeration trailer air distribution chute is in the unexpanded state.
Figure 7A:
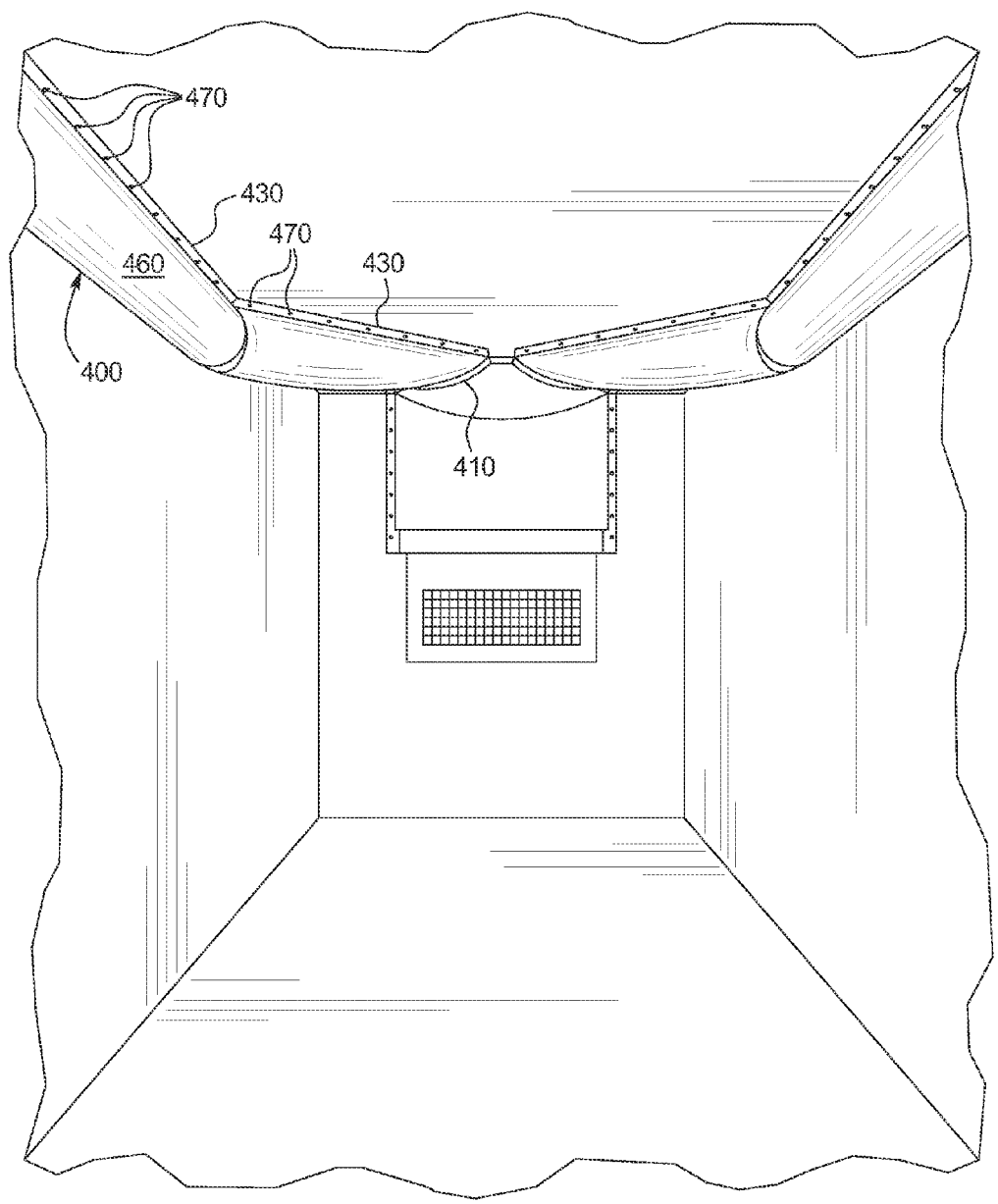
FIG. 7A is a front elevational view into the interior of the refrigeration trailer of FIG. 1 in which the plurality of refrigeration trailer air distribution chutes of FIGS. 5A, 5B, and 5C are installed, wherein the refrigeration trailer air distribution chutes are in an expanded state.
Figure 7B:
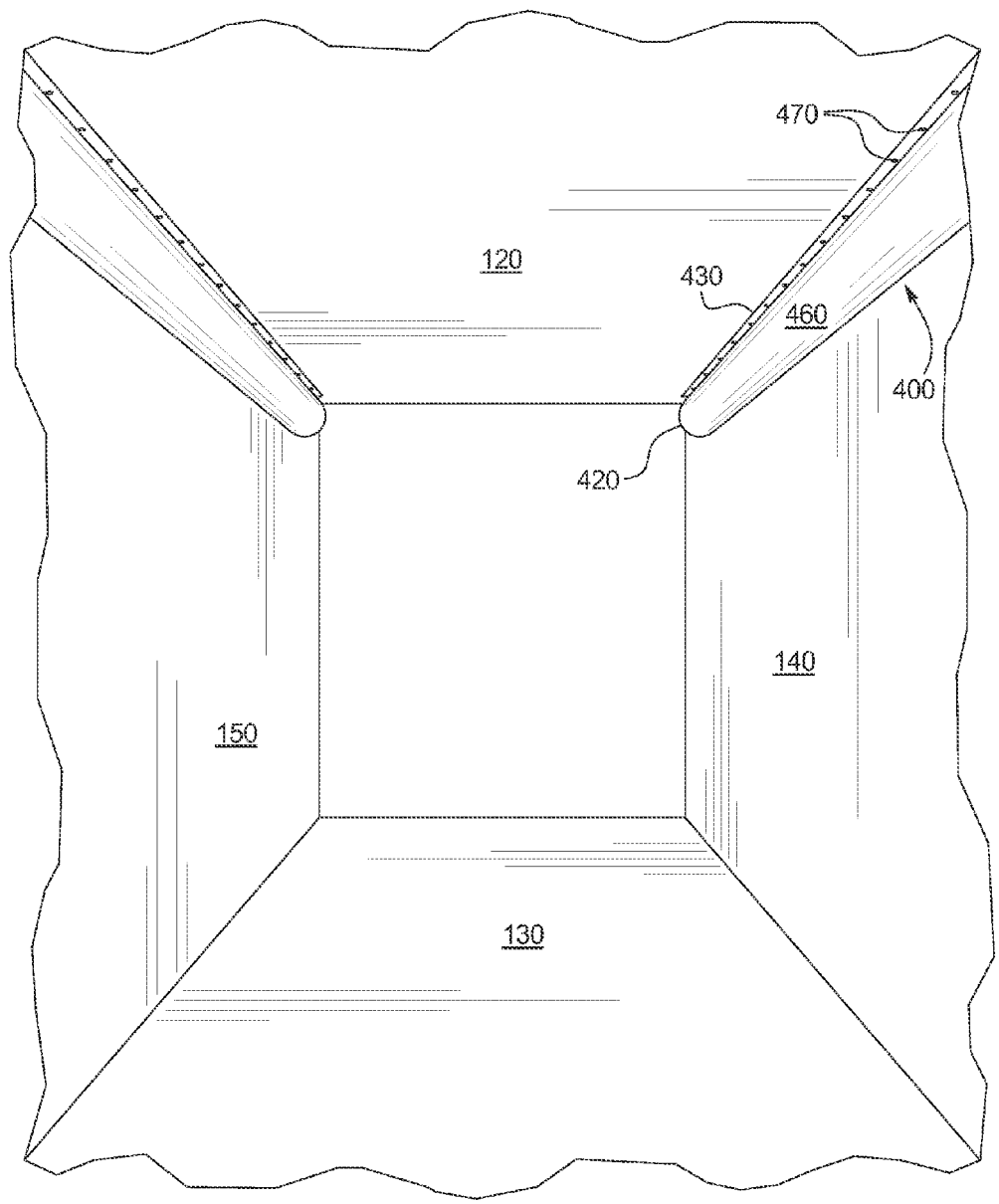
FIG. 7B is a front elevational view out of the interior of the refrigeration trailer of FIG. 1 in which the plurality of refrigeration trailer air distribution chutes of FIGS. 5A, 5B, and 5C are installed, wherein the refrigeration trailer air distribution chutes are in the expanded state.

Accordingly, as best shown in FIG. 6B, because the first air distributor 400a of the air distribution chute 400 is attached to the ceiling 120 of the refrigeration trailer 100 along two lines of attachment, the center of the first air distributor 400a of the air distribution chute 400 hangs or droops from the ceiling 120 along the entire length of the first air distributor 400a, forming a "U" or a "V" shaped cross-section when the air distribution chute 400 is in the unexpanded shape. It should be appreciated that the width and height of the "U" or "V" shaped cross section varies based on distance from the air flow adapter 300. In this example, near the air flow adapter 300, the "U" or "V" shaped cross section of the first air distributor 400 is wider than it is tall, and moving along the first air distributor 400a from the air flow adapter 300 toward the first side wall 140: (a) the width of the "U" or "V" shaped cross section of the first air distributor 400a decreases, and (b) the height of the "U" or "V" shaped cross section of the first air distributor 400a increases.

For each set of aligned holes 432a and 442a of the second air distributor 400b of the air distribution chute 400, the installer inserts a fastener 600 through the grommet 470 inserted into that set of aligned holes 432a and 442a and into the ceiling 120 proximate the first side wall 140 to attach the second air distributor 400b of the air distribution chute 400 to the ceiling 120. Thus, as best shown in FIG. 5C, the second air distributor 400b of the air distribution chute 400 is attached to the ceiling 120 along a single line of attachment: a line of attachment associated with the grommets 470 inserted into the sets of aligned holes 432a and 442a. Accordingly, as best shown in FIG. 6A, the second air distributor 400b of the air distribution chute has a cross section of a substantially elliptical shape when the air distribution chute 400 is in the unexpanded state. It should be appreciated that, in other embodiments, the transition between the first air distributor and the second air distributor may occur before or after the air distribution chute reaches the first side wall.

FIGS. 7A, 7B, 8A, 8B, and 9 illustrate various views of the air distribution chute 400 after installation and in an expanded state, such as when the refrigeration unit 200 is expelling air through the air outlet 220. After installation, the air distribution chute 400 is fluidically connected to the air outlet 220 of the refrigeration unit 200 and to the air flow adapter 300 such that, when the refrigeration unit 200 expels cooled air through the air outlet 220: (a) the air flow adapter 300 funnels the expelled cooled air through the first air flow adapter outlet and into the chute inlet, (b) the cooled air flows from the chute inlet through the air distribution chute 400 to the chute outlet, and (c) the cooled air is expelled through the chute outlet into the rear of the refrigeration trailer 100.

Figure 8A:
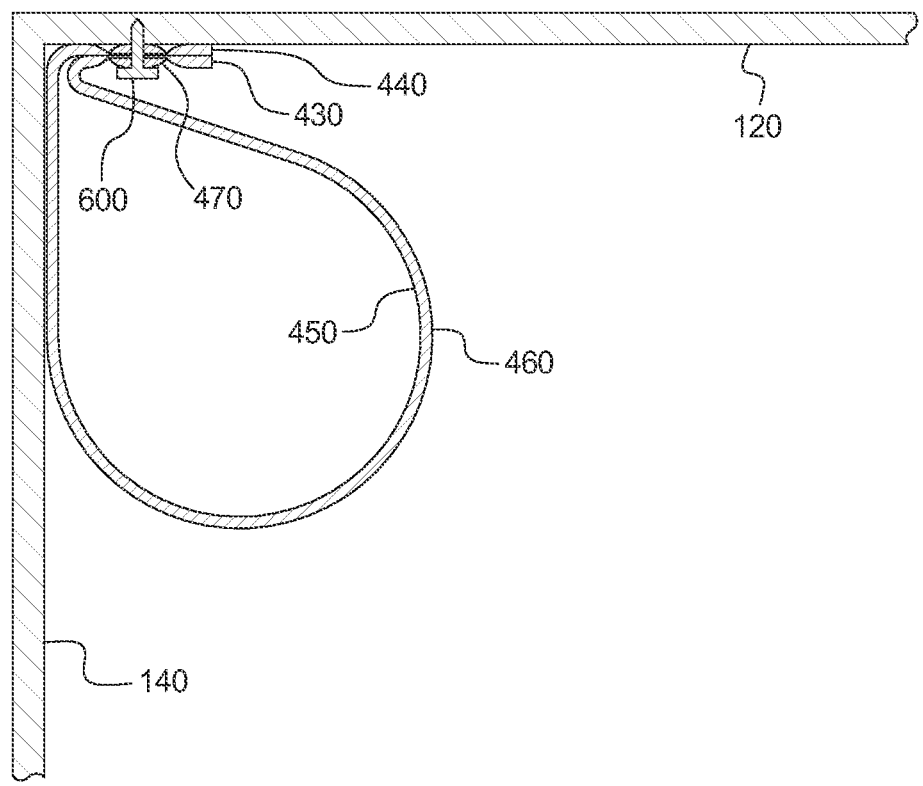
FIG. 8A is a cross-sectional view of the first air director of one of the installed refrigeration trailer air distribution chutes of FIGS. 5A, 5B, and 5C taken substantially along line 8A-8A of FIG. 5C, wherein the refrigeration trailer air distribution chute is in the expanded state.
Figure 8B:
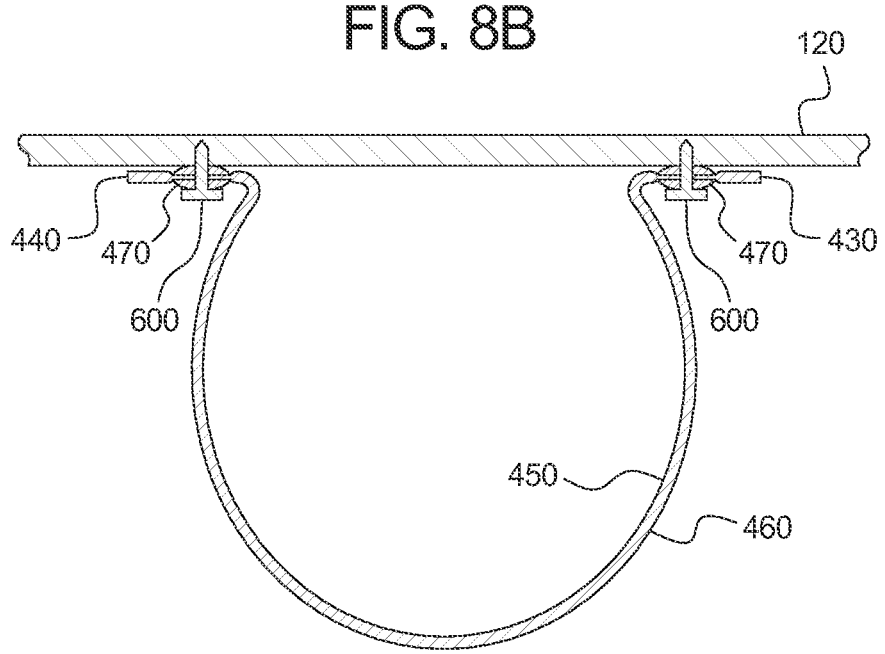
FIG. 8B is a cross-sectional view of the second air director of one of the installed refrigeration trailer air distribution chutes of FIGS. 5A, 5B, and 5C taken substantially along line 8B-8B of FIG. 5C, wherein the refrigeration trailer air distribution chute is in the expanded state.
Figure 9:
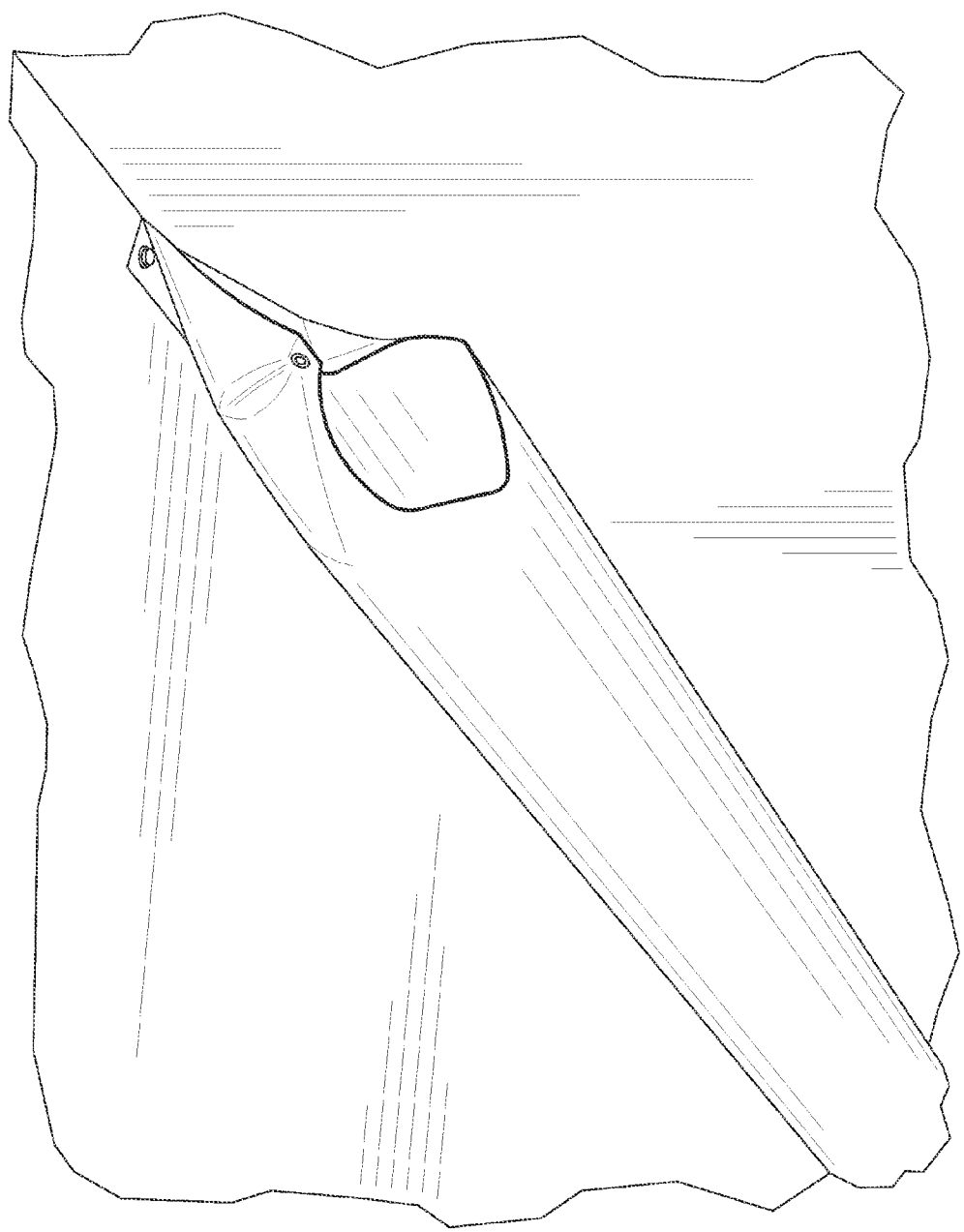
FIG. 9 is bottom perspective view of a rear end of one of the installed refrigeration trailer air distribution chutes of FIGS. 5A, 5B, and 5C in the expanded state.

As best shown in FIGS. 8A and 8B, when the air distribution chute 400 is in the expanded state, the first air distributor 400a of the air distribution chute 400 has "U" or "V" shaped cross section, and the second air distributor 400b of the air distribution chute 400 has a substantially circular cross section. That is, because the first air distributor 400a of the air distribution chute 400 is attached to the ceiling 120 of the refrigeration trailer 100 along two lines of attachment, the cross section of the first air distributor 400a has a "U" or "V" shape regardless of whether the air distribution chute 400 is in the unexpanded state or the expanded state. On the other hand, because the second air distributor 400b of the air distribution chute 400 is attached to the ceiling 120 of the refrigeration trailer 100 along a single line of attachment, the cross section of the second air distributor 400b has a substantially elliptical cross section when the air distribution chute 400 is in the unexpanded state and a different substantially circular cross section when the air distribution chute 400 is in the expanded state. Thus, the general shape of the cross section of the second air distributor 400b varies based on whether the air distribution chute 400 is in the unexpanded state or the expanded state.

In this embodiment, the first air distributor and the second air distributor are integral; that is, made from a single piece of material. In other embodiments, the first air distributor and the second air distributor are non-integral: that is, made from two or more separate pieces of material and connected together.

In this embodiment, the air distribution chute is made of vinyl, though it should be appreciated that the air distribution chute may be made of any suitable material, such as woven polyethylene, coated nylon, or mesh.

In another embodiment, the first and second side edges of the air distribution chute are connected at one or more connection points down their entire lengths. In one example, the first and second edges are sewed or otherwise fused together to form a continuous tube prior to installation. In this example, the completely-fused edges prevent air from leaking through the spaces between grommets when air is flowing through the air distribution chute.

The refrigeration trailer air distribution chute of the present disclosure solves the above-described problems. As noted above, because the second air director of the refrigeration trailer air distribution chute is attached to the ceiling along a single line of attachment, in the unexpanded state, the second air director of the refrigeration trailer air distribution chute hangs substantially parallel to and along the side wall of the refrigeration trailer. Since the second air director of the refrigeration trailer air distribution chute in the unexpanded state hangs substantially parallel to and along the side wall of the refrigeration trailer, the potential for damage to the refrigeration trailer air distribution chute when loading and unloading cargo into and from the refrigeration trailer, such as tearing the refrigeration trailer air distribution chute or ripping the refrigeration trailer air distribution chute from the ceiling, is minimized. This greatly reduces the need for replacement of, repairs to, or re-installation of the refrigeration trailer air distribution chute.

Additionally, the installation process for the refrigeration trailer air distribution chute of the present disclosure is simple and quick—it does not require any guide lines to be measured or drawn and enables the installer to use the corner where the ceiling of the refrigeration trailer meets the side wall of the refrigeration trailer to properly align the refrigeration trailer air distribution chute. Also, since the second air director of the refrigeration trailer air distribution chute is attached to the ceiling along a single line of attachment, the refrigeration trailer air distribution chute of the present disclosure is attached to the ceiling at about half of the quantity of attachment points as traditional known air distribution chutes.

Further, since the second air director of the refrigeration trailer air distribution chute is attached to the ceiling along a single line of attachment and hangs substantially parallel to and along the side wall of the refrigeration trailer in the unexpanded state, the refrigeration trailer air distribution chute covers a minimal amount of the ceiling and a minimal amount (if any) of any lights on the ceiling. This also substantially reduces heat transfer from the ceiling of the refrigeration trailer to the cooled air.

It should be understood that modifications and variations may be effected without departing from the scope of the novel concepts of the present disclosure, and it should be understood that this application is to be limited only by the scope of the appended claims.

The invention is claimed as follows:

1. A refrigeration trailer air distribution chute having an unexpanded state and an expanded state, the refrigeration trailer air distribution chute comprising:
    a first air director: (1) including a first mounting portion including multiple spaced-apart first fastener elements, (2) including a second mounting portion including multiple spaced-apart second fastener elements, and (3) at least partially defining a chute inlet, wherein the first air director is made of a deformable material such that a portion of the first air director has: (1) a first cross section when the refrigeration trailer air distribution chute is in the unexpanded state; and (2) a second cross section different from the first cross section when the refrigeration trailer air distribution chute is in the expanded state, wherein the first air director is attachable to a refrigeration trailer via the first and second fastener elements along spaced-apart first and second lines of attachment, respectively; and
    a second air director: (1) fluidically connectable to the first air director, (2) including a third mounting portion including multiple spaced-apart third fastener elements, and (3) including a rear edge at least partially defining a chute outlet, the second air director made of a deformable material such that a portion of the second air director has a third cross section when the refrigeration trailer air distribution chute is in the unexpanded state and a fourth cross section different from the third cross section when the refrigeration trailer air distribution chute is in the expanded state, wherein the second air director is attachable to the refrigeration trailer via the third fastener elements along a third line of attachment different from the first and second lines of attachment.

2. The refrigeration trailer air distribution chute of claim 1, wherein the first air director is attachable to a ceiling of the refrigeration trailer via the first and second fastener elements along the first and second lines of attachment.

3. The refrigeration trailer air distribution chute of claim 1, wherein the second air director is attachable to a ceiling of the refrigeration trailer via the third fastener elements along the third line of attachment.

4. The refrigeration trailer air distribution chute of claim 1, wherein the third cross section is at least partially elliptical and the fourth cross section is at least partially circular.

5. The refrigeration trailer air distribution chute of claim 1, wherein the first and second cross sections have the same first shape.

6. The refrigeration trailer air distribution chute of claim 5, wherein the third cross section has a third shape, the fourth cross section has a fourth shape, and the first shape is different from the third shape and the fourth shape.

7. The refrigeration trailer air distribution chute of claim 6, wherein the third shape is at least partially elliptical, the fourth shape is at least partially circular, and the first shape is at least partially "U" shaped.

8. The refrigeration trailer air distribution chute of claim 1, wherein the rear edge has the third cross section when refrigeration trailer air distribution chute is in the unexpanded state and the fourth cross section when the refrigeration trailer air distribution chute is in the expanded state.

9. The refrigeration trailer air distribution chute of claim 8, wherein the third cross section is at least partially elliptical and the fourth cross section is at least partially circular.

10. The refrigeration trailer air distribution chute of claim 1, wherein the third fastener elements include a plurality of grommets each defining an opening sized to receive a fastener.

11. The refrigeration trailer air distribution chute of claim 1, wherein a front edge of the first air director at least partially defines the chute inlet.

12. The refrigeration trailer air distribution chute of claim 1, wherein the first and second fastener elements include a plurality of grommets each defining an opening sized to receive a fastener.

13. A refrigeration trailer air distribution chute having an unexpanded state and an expanded state, the refrigeration trailer air distribution chute comprising:
    a first air director: (1) including a first mounting portion including multiple spaced-apart first fastener elements; and (2) including a second mounting portion including multiple spaced-apart second fastener elements, wherein the first air director is attachable to a refrigeration trailer via the first and second fastener elements along spaced-apart first and second lines of attachment, respectively, the first air director made of a deformable material such that a portion of the first air director has a first cross section when the refrigeration trailer air distribution chute is in the unexpanded state and a second cross section different from the first cross section when the refrigeration trailer air distribution chute is in the expanded state; and
    a second air director: (1) fluidically connectable to the first air director; and (2) including a third mounting portion including multiple spaced-apart grommets, wherein the second air director is attachable to the refrigeration trailer via the grommets along only one third line of attachment different from the first and second lines of attachment, the second air director made of a deformable material such that a portion of the second air director has a third cross section of a third shape when the refrigeration trailer air distribution chute is in the unexpanded state and a fourth cross section different from the third cross section and having a fourth shape when the refrigeration trailer air distribution chute is in the expanded state.

14. The refrigeration trailer air distribution chute of claim 13, wherein the first shape, the third shape, and the fourth shape are different.

15. The refrigeration trailer air distribution chute of claim 13, wherein the first shape is at least partially "U" shaped, the third shape is at least partially elliptical, and the fourth shape is at least partially circular.

16. The refrigeration trailer air distribution chute of claim 13, wherein when the refrigeration trailer air distribution chute is attached to the refrigeration trailer and in the unexpanded state, at least a portion of the second air director is substantially parallel to a side wall of the refrigeration trailer.

17. The refrigeration trailer air distribution chute of claim 13, wherein the third fastener elements include a plurality of grommets each defining an opening sized to receive a fastener.

18. The refrigeration trailer air distribution chute of claim 13, wherein the first and second fastener elements include a plurality of grommets each defining an opening sized to receive a fastener.

19. The refrigeration trailer air distribution chute of claim 13, wherein the first and second lines of attachment are convergent.

20. The refrigeration trailer air distribution chute of claim 13, wherein at least a portion of the one line of attachment of the second air director is substantially parallel to an edge of the ceiling of the refrigeration trailer when the refrigeration trailer air distribution chute is attached to the refrigeration trailer.

21. The refrigeration trailer air distribution chute of claim 1, wherein the first and second lines of attachment are convergent.

22. The refrigeration trailer air distribution chute of claim 13, wherein the first air director is attachable to a ceiling of the refrigeration trailer via the first and second fastener elements along the first and second lines of attachment.

23. The refrigeration trailer air distribution chute of claim 13, wherein the second air director is attachable to a ceiling of the refrigeration trailer via the third fastener elements along the third line of attachment.

24. The refrigeration trailer air distribution chute of claim 1, wherein the first, second, and third lines of attachment are straight.

25. The refrigeration trailer air distribution chute of claim 13, wherein the first, second, and third lines of attachment are straight.

26. The refrigeration trailer air distribution chute of claim 1, wherein the second air director is integral with the first air director.

27. The refrigeration trailer air distribution chute of claim 13, wherein the second air director is integral with the first air director.

* * * * *